(12) United States Patent
Richard

(10) Patent No.: US 8,776,389 B2
(45) Date of Patent: Jul. 15, 2014

(54) TAPE-MEASURE DEVICE HAVING AN L-SHAPED PIVOTABLE END PIECE HAVING A SLOT FOR GUIDING A TOOL

(76) Inventor: Frédéric Richard, Dourges (FR)

( * ) Notice: Subject to any disclaimer, the term of this patent is extended or adjusted under 35 U.S.C. 154(b) by 331 days.

(21) Appl. No.: 13/515,602

(22) PCT Filed: Feb. 10, 2010

(86) PCT No.: PCT/FR2010/000102
§ 371 (c)(1),
(2), (4) Date: Aug. 28, 2012

(87) PCT Pub. No.: WO2011/018560
PCT Pub. Date: Feb. 17, 2011

(65) Prior Publication Data
US 2012/0317828 A1    Dec. 20, 2012

(30) Foreign Application Priority Data
Aug. 14, 2009 (FR) ...................................... 09 03979

(51) Int. Cl.
*G01B 3/10* (2006.01)

(52) U.S. Cl.
USPC .................... 33/758; 33/755; 33/768; 33/770

(58) Field of Classification Search
CPC ...... G01B 3/10; G01B 3/1082; G01B 3/1005; G01B 3/1056; G01B 3/1084; G01B 3/1071; G01B 3/1041; G01B 2003/1053; G01B 2003/1076; G01B 2003/1079; G01B 2003/1097; G01B 2003/1089; G01B 2003/1046
USPC ..................................... 33/755, 758, 768, 770
See application file for complete search history.

(56) References Cited

U.S. PATENT DOCUMENTS

| | | | |
|---|---|---|---|
| 2,934,827 A | 5/1960 | Barto | |
| 5,600,894 A * | 2/1997 | Blackman et al. | 33/758 |
| 5,845,412 A | 12/1998 | Arcand | |
| 6,101,734 A * | 8/2000 | Ten Caat et al. | 33/770 |
| 6,553,684 B2 * | 4/2003 | Jenkins et al. | 33/770 |

(Continued)

FOREIGN PATENT DOCUMENTS

| | | | | |
|---|---|---|---|---|
| DE | 10 2007 037136 A1 | 2/2009 | | |
| WO | WO 2011018560 A1 * | 2/2011 | ........... | G01B 3/1056 |

OTHER PUBLICATIONS

International Search Report, dated Jun. 4, 2010, from corresponding PCT application.

*Primary Examiner* — Yaritza Guadalupe-McCall
(74) *Attorney, Agent, or Firm* — Young & Thompson

(57) ABSTRACT

A tape-measure device having elements for measuring and/or marking/cutting an object, includes a tape, a shell (3) with a reel, an opening (5) enabling the tape (2) to pass through the shell wall, an end piece (6) attached to the distal end of the tape, a stop button (7) for the reel for blocking the tape or for enabling the rolling/unrolling of the tape. The elements include a guide shoulder (8) formed on the shell, a guide opening (9) at the end piece for the removable insertion of the end of a marking/cutting tool, and a sliding surface (60) for the end piece for translatably engaging the surface of the object to mark/cut the object using one of the surfaces thereof when the guide shoulder is simultaneously slid along an edge of the object and the end piece of the tape against the surface of the object to be marked/cut.

13 Claims, 5 Drawing Sheets

(56) References Cited

U.S. PATENT DOCUMENTS

Figure 1:
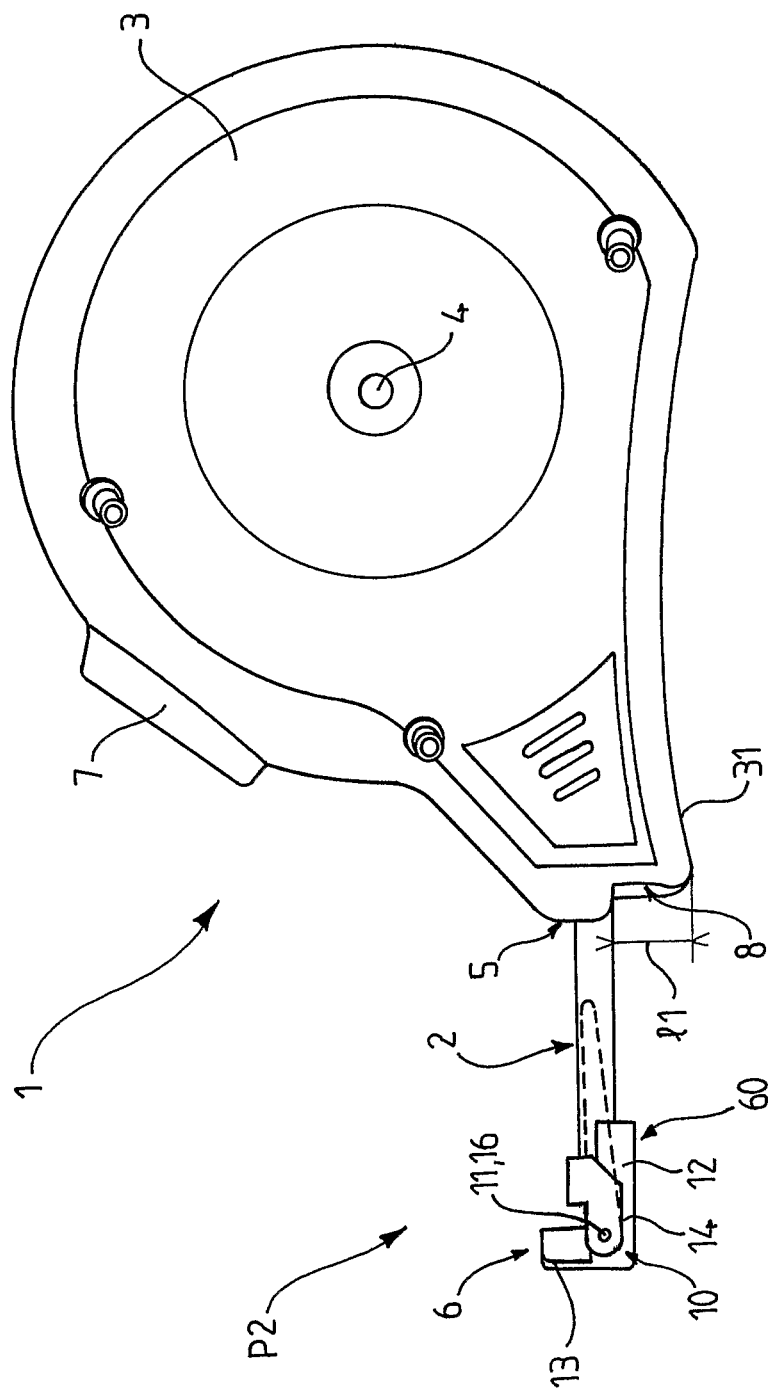

| | | | |
|---|---|---|---|
| 7,185,446 B1* | 3/2007 | King | 33/758 |
| 7,266,905 B1* | 9/2007 | Lee | 33/758 |
| 7,281,340 B2* | 10/2007 | Greally | 33/758 |
| 2002/0095814 A1* | 7/2002 | Jenkins et al. | 33/770 |
| 2003/0019116 A1* | 1/2003 | DeWall | 33/770 |
| 2006/0185185 A1 | 8/2006 | Scarborough | |
| 2008/0141549 A1 | 6/2008 | Brown | |
| 2008/0250664 A1* | 10/2008 | Wise | 33/770 |
| 2012/0317828 A1* | 12/2012 | Richard | 33/761 |

* cited by examiner

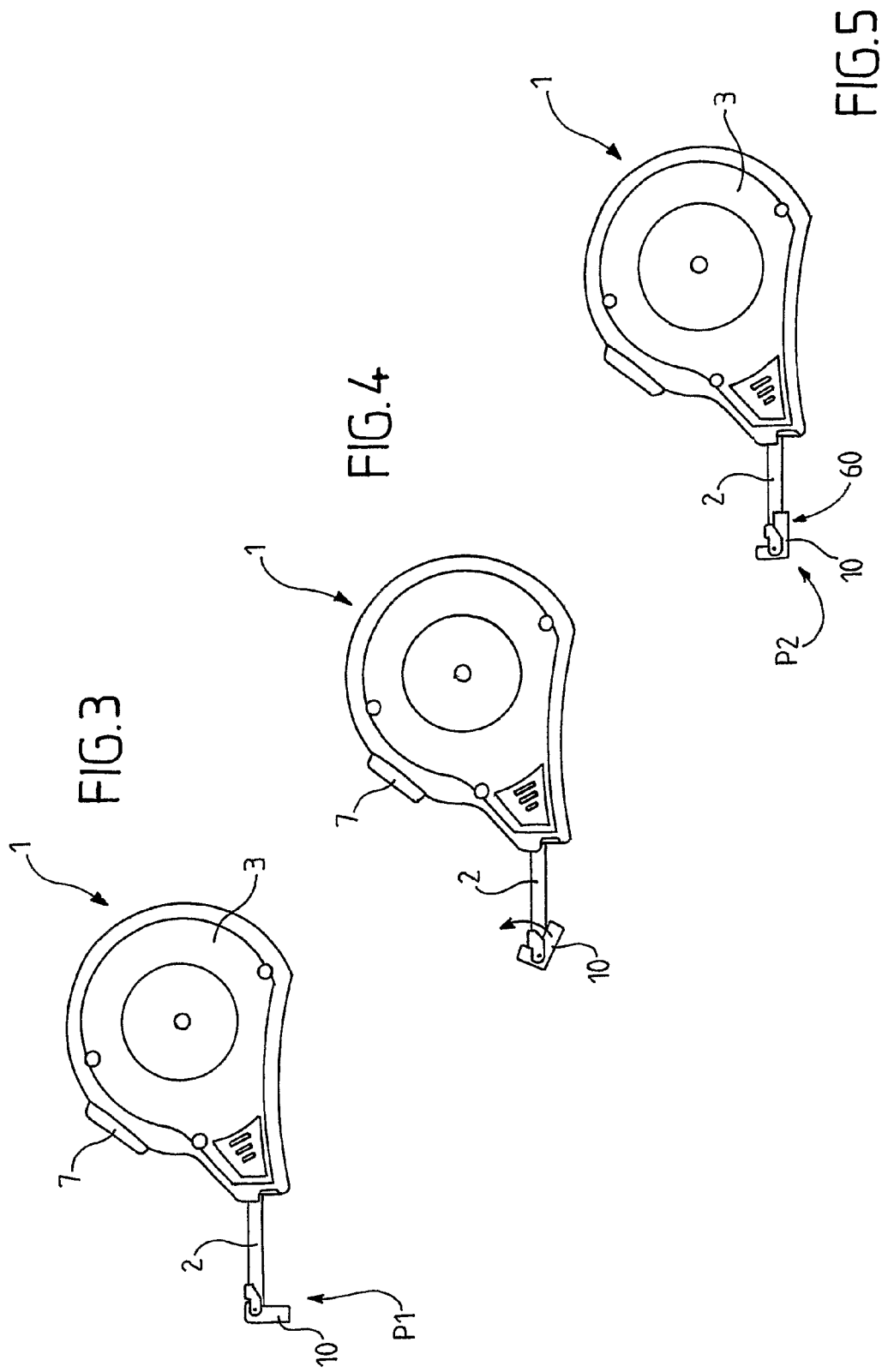

TAPE-MEASURE DEVICE HAVING AN L-SHAPED PIVOTABLE END PIECE HAVING A SLOT FOR GUIDING A TOOL

The invention relates to a tape-measure device provided with a means for measuring and/or marking and even cutting an object.

The field of the invention is that of the tape-measure with reel.

Such devices include in a known manner:
- a tape, generally made of metal, bearing measurement marks, such as in particular millimeters and centimeters,
- a shell, generally made of plastic and in two portions, provided with a reel, shell wherein the tape can be rolled or unrolled,
- an opening enabling the tape to pass through the wall of the shell, able to engage with the wall of the shell for the indication of the measurement,
- an end piece, very often in the form of a metal square, attached to the distal end of said tape in order to constitute a rolling stop,
- a stop button for said reel, provided at the shell, for blocking said tape or on the contrary for the rolling/unrolling of said tape.

Such devices have long since been very widespread and enjoy great success with the public and/or professionals in the building trade in particular.

Some of these known devices combine not only a measurement function, but also a function for marking objects.

Such a device for measuring or marking is as such known in document US-2006/0185185, of which the shell is integral with a marking system comprising a marking wheel and a reservoir for a marking powder such as chalk.

This device makes it possible to trace lines on an object by bracing the square of the end piece of the tape on the edge of an object to be marked, in particular the edge of a board, and by simultaneously sliding the square along the edge and the wheel on the surface to be marked. During this, the wheel rolls on the surface while marking it, the wheel taking on marking powder from the reservoir.

Such a device remains delicate to use as the maintaining parallel of the end piece of the tape and of the marking system, and subsequently the traced line, depends substantially on the dexterity of the user.

Also known is document U.S. Pat. No. 2,934,827 filed in 1958, a device for engraving. This device has a tape bearing measurement marks, a shell wherein the tape-measure can be rolled or unrolled through an opening for the passage of said tape. This device also has a first tip integral with the shell protruding under the latter, and a second tip, for engraving, provided to be integral at the distal end of the tape.

This device is used, such as a compass, for tracing circles, the first tip being used as a support in rotation on the centre of the circle to be traced, the second tip used as a tip for engraving the circle.

Furthermore, the device described in document U.S. Pat. No. 2,939,827 has, in the immediate vicinity of the tape, a first guide extending in front of the shell, in a direction parallel to said tape, and a second guide, parallel to the first guide. The first guide and the second guide are spaced a short distance apart making it possible to insert therein a thin sheet of material.

This device as such makes it possible to engrave a straight line on said sheet, with the latter being braced against the case, inserted between the two aforementioned guides by simultaneously sliding the shell along the edge of the sheet and the tip for engraving on the surface of the sheet.

The tip for engraving in document U.S. Pat. No. 2,934,827 is attached to the end of the tape which forms a loop at this end. This tip comprises a rod, passes through two corresponding holes of the loop at the end of the tape. The tip for engraving further has a lateral projection internal to the loop, authorizing a translation of the tip for engraving a course of travel that is limited only between two positions, i.e. a position wherein it constitutes a tip for engraving with a level corresponding to the first tip integral with the shell, the device then able to be used, such as a compass, and a second position wherein this tip is substantially at the two guides of the shell intended for engraving straight lines on the sheet of material.

This device however has various disadvantages:
- With two tips protruding and two guides protruding from the shell of the reel, this device is particularly unsuitable, inconvenient, and awkward, for simple measurement operations; for example a user will not be able to place this device in his pocket without risk.
- This device can trace straight lines only on certain objects, i.e. sheets of material that are sufficiently thin to be able to be inserted in the two guides protruding in front of the shell; it is indeed unsuitable for boards of which the thickness exceeds the spacing between these two guides.

The purpose of this invention is therefore to propose a tape-measure device provided with a means for measuring and/or marking/cutting an object subjected to said device which overcomes the aforementioned disadvantages and which does not alter the ease of use of said device for simple measurement operations.

Another purpose of this invention is to propose such a device which makes it possible to easily mark/cut an object, in particular a board, regardless of its thickness.

Another purpose of this invention is to propose such a device suitable more particularly for cutting boards, in particular of plaster, for example known under the name "gypsum board" with a thickness of 13 mm.

Another purpose of this invention is to propose such a device which makes possible cutting operations using the blade of a cutter.

Another purpose of this invention is to propose such a device that makes possible the marking of objects using a pencil, pen or similar item.

Other purposes and advantages of this invention shall appear during the following description, which is provided solely for the purposes of information and which does not have the purpose of restricting it.

The invention relates to a tape-measure device provided with a means for measuring and/or for marking/cutting an object subjected to said device, comprising:
- a tape bearing measurement marks,
- a shell, provided with a reel, wherein the tape can be rolled or unrolled around a winding axis of said reel,
- an opening enabling said tape to pass through the wall of the shell, able to engage with said wall of the shell for the indication of the measurement,
- an end piece, attached to the distal end of said tape, engaging with said shell, at said opening for passage in order to constitute a rolling stop,
- a stop button for said reel, provided at said shell for blocking said tape or on the contrary for the rolling/unrolling of said tape.

According to the invention, the means for marking/cutting an object are comprised of:
- a guide shoulder formed on said shell at said opening for the passage of said tape, for translatable engaging along an edge of an object to be marked/cut, a guide opening at said end piece for the removable insertion of the end of a marking/cutting tool and the guiding of said end of the tool, a sliding surface for said end piece, for translatably engaging the surface of the object to be marked/cut, in order to mark/cut said object using one of the surfaces thereof when said guide shoulder is simultaneously slid along an edge of said object and said end piece of the tape against the surface of the object to be marked/cut.

Said device can further have the following characteristics taken alone or in combination:

said end piece comprises a square articulated according to an axis of rotation, parallel to the winding axis of said reel when the tape is unrolled in a straight manner, without torsion, said square having two wings that are substantially perpendicular to one another, referred to as first wing and second wing, said first wing having said guide opening and said sliding surface, and wherein said square can pass from a first measuring position wherein said first wing is substantially perpendicular to said tape, said second wing engaging as a stop with said tape, to a second position for the marking or the cutting wherein said first wing is retracted against the tape, comprising a pad for said surface to be marked/cut, said guide opening then being located in front of the distal end of said tape;

the end piece is comprised of said square and an element attached in an integral manner at the end of said tape, said fastening element having two lugs located in front of the end of said end piece engaging in rotation respectively with two coaxial trunnions of said square;

the section of the tape is concave, said second wing of said square having a section of curvature corresponding to the concavity of the section of the tape in such a way that said second wing hugs the section of said tape in said first measuring position;

said guide shoulder of the shell consists of a first surface which extends in the plane of said opening for the passage of said tape and of a second surface perpendicular to said first surface;

said second surface is comprised of two protrusions of the shell, arranged on either side of said opening for passage;

the first surface of said guide shoulder is of a height between 5 mm and 13 mm;

the guide opening comprises an oblong opening, with a longitudinal axis parallel to the winding axis of said reel when said tape is unrolled in a straight manner, without torsion, intended to insert therein the blade of a cutter, in a removable manner;

the guide opening comprises, in addition to said oblong opening, a median notch, of greater width, intended for inserting therein the tip of a pencil in a removable manner;

the means for marking/cutting an object are dimensioned for the marking or the cutting plaster boards with a thickness of 13 mm.

The invention also relates to the use of the tape-measure device in accordance with the invention for the marking or the cutting of an object having at least one surface and one edge of said surface, wherein:

said guide shoulder is placed against the edge of said object by adjusting the length of the tape according to the measurement of the object to be marked/cut, the end piece of said tape braced against said surface of said object, the end of a tool for marking/cutting is inserted into the guide opening of said end piece, said object is cut or is marked by simultaneously sliding said guide shoulder along the edge of said object and the end piece of the tape against the surface of said object to be marked/cut.

Figure 2:
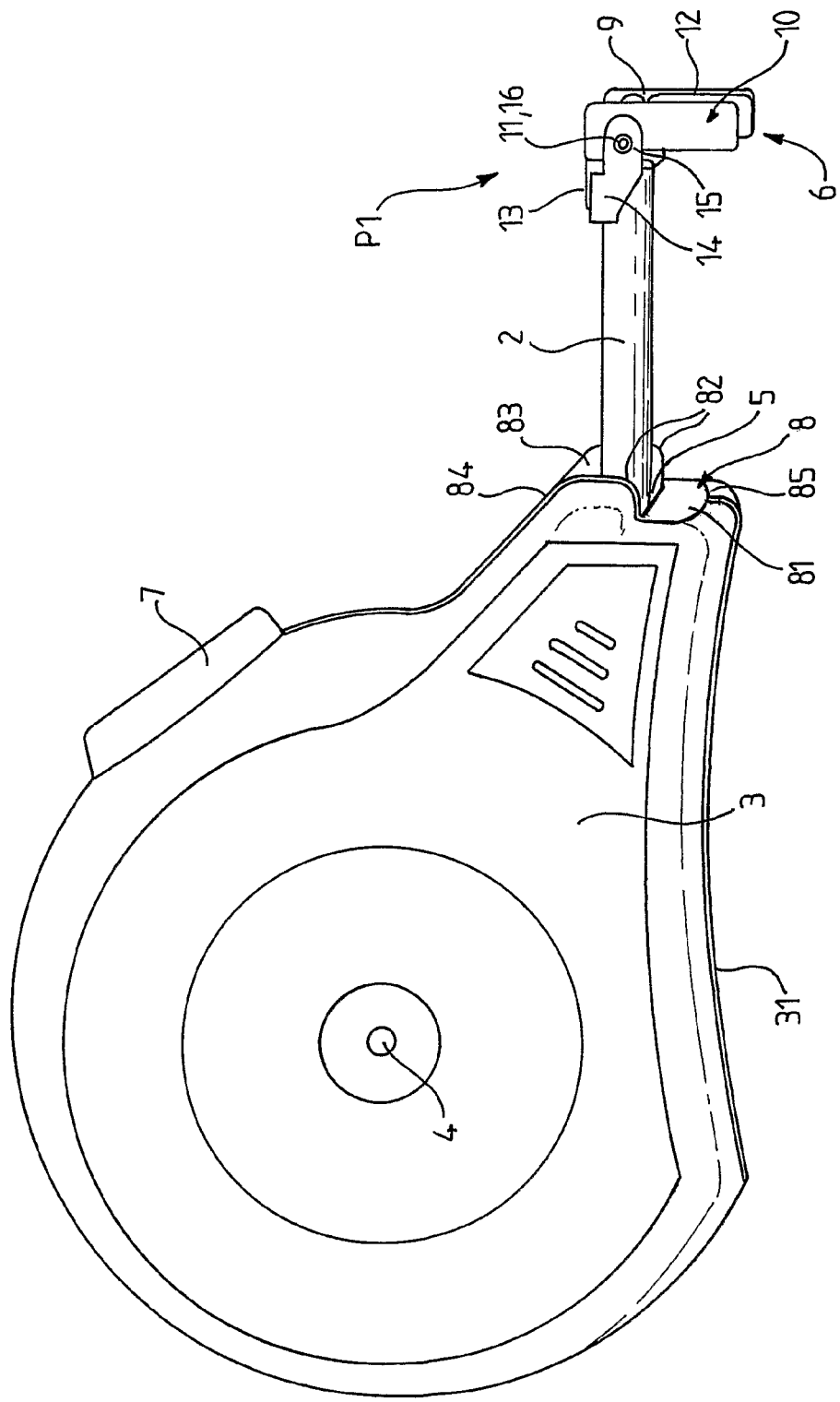
Figure 6:
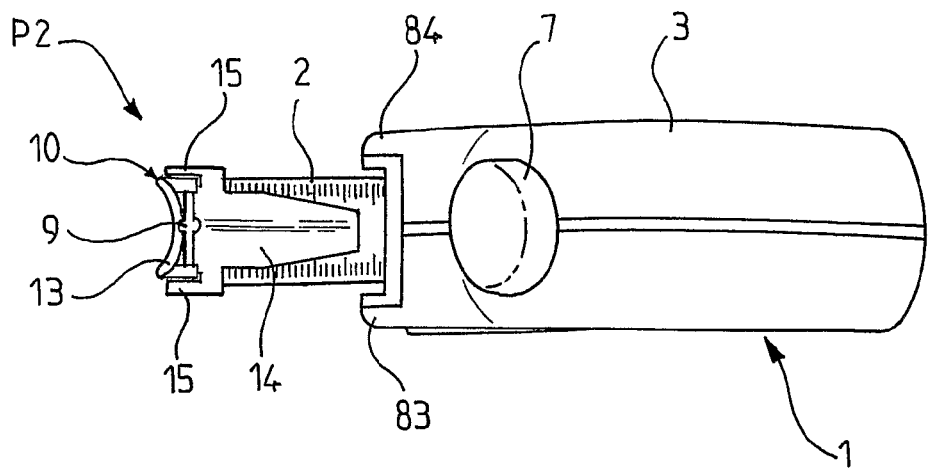
Figure 7:
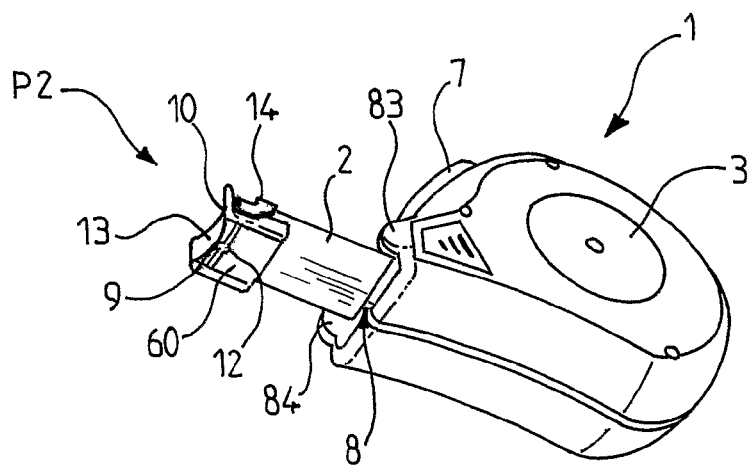
Figure 8:
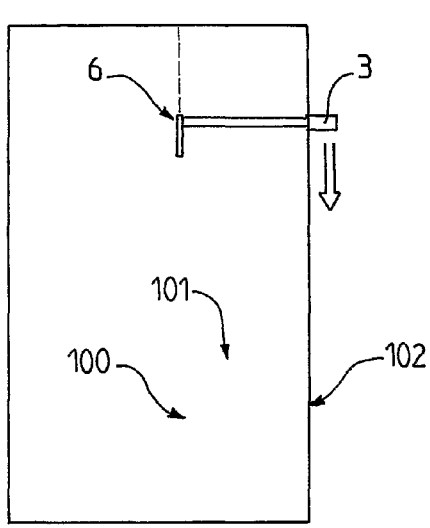
Figure 10:
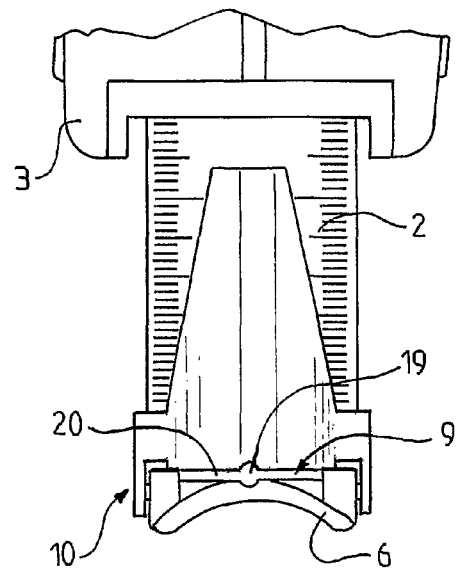
Figure 9:
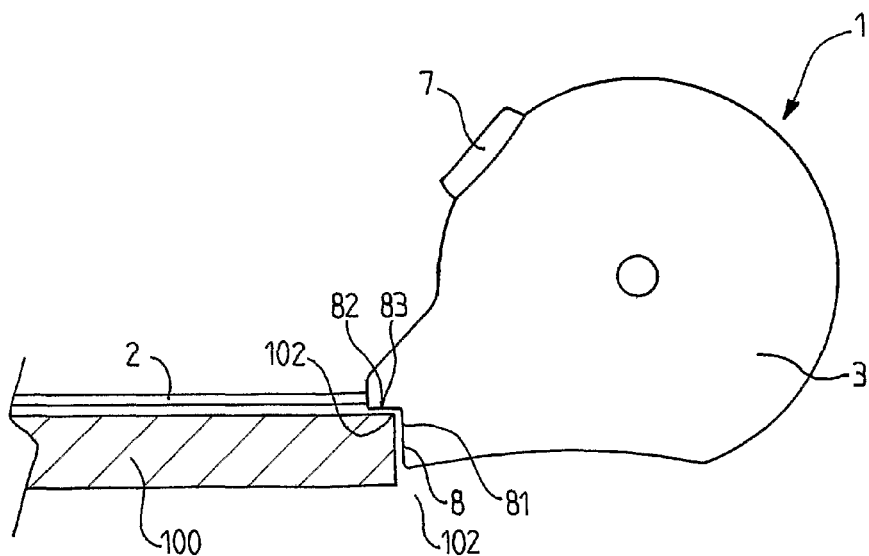

The invention shall be better understood when reading the description accompanied with the annexed drawings wherein:

FIG. 1 is a side view of the device in accordance with the invention according to an embodiment, in its configuration provided for the marking or the cutting of an object, FIG. 2 is a view of the device such as shown in FIG. 1, the square of the end piece of the end of the tape, tilted 90°, in a configuration of the device particularly intended for measurement operations, FIGS. 3 to 5 are respectively side views of the device such as shown in FIG. 1, showing the tilting of said square from a position particularly intended for measurement operations, shown in FIG. 3, to a position of said square particularly intended for the marking or the cutting of objects, such as shown in FIG. 5, FIG. 6 is a top view of the device such as shown in FIG. 1, FIG. 7 is a bottom view of the device such as shown in FIG. 6, FIG. 8 shows the operation of the device during marking/cutting operations of an object, more particularly of a board, FIG. 9 is a side view showing more particularly the engaging between the guide shoulder of the device and an edge of the object, in particular of a board, FIG. 10 is a view showing more particularly the guide opening of the device.

The invention relates to a tape-measure device 1 provided with a means for measuring and/or for marking/cutting an object subjected to said device.

This device comprises:

a tape 2 bearing measurement marks (millimeters, centimeters, . . . ) for example made of metal, in particular with a concave section viewed from the surface of the tape bearing the marks, a shell 3, in particular of moulded plastic, provided with a reel, wherein the tape can be rolled or unrolled around a winding axis of said reel, an opening 5 enabling said tape 2 to pass through the wall of the shell 3, able to engage with said wall of the shell for the indication of the measurement, an end piece 6, attached to the distal end of said tape 2, engaging with said shell, at said opening for passage 5 in order to constitute a rolling stop, a stop button 7 of said reel, provided at said shell for blocking said tape or on the contrary the rolling/unrolling of said tape 2.

This device can as such be easily used for simple measurement operations. The tape can be unrolled in order to carry out the measurement at a distance. The measurement is read between the end of said end piece and the opening for passage of the shell. The tape can be blocked using said stop button 7. Once the stop button 7 is in its unlocked position, the reel causes the automatic rolling of said tape in the shell until said end piece 6 engages as a stop with the shell 3 at the opening for the passage 5 of said tape.

According to the invention, the means for marking/cutting an object subjected to said device are comprised of:

a guide shoulder 8 formed on said shell 3 at said opening for the passage 5 of said tape, for translatably engaging along an edge 70 of an object to be marked/cut, a guide opening 9, provided at the end piece, for the removable insertion of the end of a marking/cutting tool and the guiding of said end of the tool, a sliding surface 60 of said end piece 6, for translatably engaging the surface of the object to be marked/cut.

The characteristics engage in order to mark/cut said object using one of the surfaces thereof when said guide shoulder is simultaneously slid along an edge of said object and said end piece 6 of the tape against the surface of the object to be marled/cut.

Advantageously, the guide shoulder 8 of the shell can comprise, such as is shown in FIG. 2, a first surface 81 which extends in the plane of said opening for the passage 5 of said tape, under said opening and a second surface 82 perpendicular to said first surface 81.

More particularly, such as is shown according to the example of the figures, the second surface 82 is comprised of two protrusions of the shell 3, arranged on either side of said opening for passage 5.

According to this example, said guide shoulder 8 is formed by said shell in particular during the moulding of the plastic parts comprising said shell. The first surface 81 of said guide shoulder can be of a height I1, in particular shown in FIG. 1, between 5 mm and 13 mm.

Said guide shoulder 8 is particularly adapted to engage along the edge, even along the edge of a part which can be a board such as for example 13 mm thick. Note that the low point 85 of the first surface 81 corresponds, according to the example, to the lowest point of the shell which allows said shoulder to engage with the edge of a board placed on the directly on the ground, without the shell of the device rubbing against this ground. To this effect, the lower wall 31 of the shell can be concave.

As is shown according to the example in FIG. 10, the guide opening 9 comprises an oblong opening 20, with a longitudinal axis parallel to the winding axis of said reel, when the tape is unrolled in a straight manner, without torsion. This oblong opening 20 is intended for inserting therein the blade of a cutter in a removable manner. To this effect, the width of the oblong opening is slightly greater than the thickness of a cutter blade.

The end piece 6 wherein is made the opening can be substantially in a resistant material, in particular made of metal, in order to prevent it from being degraded by the blade of the cutter. Furthermore, such as is shown in FIG. 10, the guide opening 9 can include, in addition to said oblong opening 20, a median notch 19, of a width greater than said oblong opening 20, intended for inserting therein the tip of a pencil in a removable manner. Of course, this opening can also be used for ball-point pens, markers, or similar items.

The sliding surface 60 of said end piece 6 is intended to translatably engage the surface of the object to be marked/cut particularly shown in FIG. 7. This sliding surface 60 makes it possible to slide on a surface without marking it. The surface can be that of a wooden board and even a plaster board. To this effect, the sliding surface 60 is devoid of sharp edges, tips or other conformations able to mark the surface.

According to an advantageous embodiment shown in the figures, said end piece 6 comprises a square 10 articulated according to an axis of rotation 11 parallel to the winding axis of said reel when the tape is unrolled in a straight manner, without torsion.

This square 10 has two wings 12, 13 substantially perpendicular to one another, referred to as first wing 12 and second wing 13. The first wing 12 shows the guide opening 9 as well as the sliding surface 60.

This square 10 can pass from a first measuring position P1 in particular shown in FIG. 3 wherein said first wing 12 is substantially perpendicular to said tape 2, said second wing engaging as a stop with said tape, to a second position P2 for the marking or the cutting wherein said first wing 12 is retracted against the tape. In the first measuring position P1 of said square, shown in FIG. 2, the first wing 12 constitutes a measurement mark in a manner similar to the end piece squares rigidly attached to the end of tapes of tape-measure devices of prior art.

However, in the second position P2 for the marking or the cutting, such as is shown in FIG. 5, the first wing 12 is retracted against the tape. In this position, it constitutes a pad for the surface to be marked/cut, the sliding surface 60 formed by the first wing 12 being then substantially parallel to the plane of the tape 2. Said guide opening 9 is then located such as is shown in FIG. 6 or 7 in front of the distal end of said tape 2.

The second wing 13 of said square 10 can have a section of curvature corresponding to the concavity of the section of the tape in such a way that said second wing 13 hugs the section of the tape in said first measuring position P1.

The passage from the first position P1 to the second position P2, and inversely, is carried out by rotating the square 90°. The rotation in one direction is limited by said second wing 13 which comes to abut against the upper surface of the tape 2 (position P1) and in the other direction by the first wing 12 which comes to abut against the lower surface of the tape 2 (position P2).

Such as is shown in FIGS. 2 and 6 in particular, the end piece 6 can be comprised of two parts, i.e. said square 10 and an element 14, attached in an integral manner at the end of said tape 2. Said fastening element 14 has two lugs 15 located in front of the end of the tape 2, engaging in rotation respectively with two coaxial trunnions of said square 10.

Such as is shown in FIG. 8, the device will find particular application for the marking or the cutting of an object having a surface 101 and an edge 102 of said surface wherein:
- said guide shoulder 8 is placed against the edge 102 of said surface by adjusting the length of the tape according to the measurement of said object to be marked/cut, the end piece 6 of the tape braced against the surface of said object,
- the end of a marking/cutting tool is inserted into the guide opening 9 of said end piece 6,
- said object is cut or is marked by sliding simultaneously said guide shoulder 9 along said edge 102 of said surface 101 and the end piece 6 of the tape against the surface 101 of said object to be marked/cut.

In particular, the object will be a board, in particular a plaster board with a thickness of 13 mm, the shoulder, in particular the first surface 80 of said shoulder, will be dimensioned less than or equal to the thickness of the board in order to engage with the edge of the latter.

Note that such arrangements, according to the invention, allow for a good application and a good maintaining of the device at the object to be marked/cut in order to not be subject to the dexterity of the user during implementation.

Naturally, other embodiments could have been considered by those skilled in the art without however leaving the scope of the invention defined by the claims hereinafter.

The invention claimed is:

1. Tape-measure device (1) provided with a means for measuring and/or for marking/cutting an object subjected to said device comprising:
   a tape (2) bearing measurement marks,
   a shell (3), provided with a reel, wherein the tape can be rolled or unrolled around a winding axis (4) of said reel,
   an opening (5) enabling said tape (2) to pass through the wall of the shell (3), able to engage with said wall of the shell for the indication of the measurement, an end piece (6), attached to the distal end of said tape (2), engaging with said shell (3) at said opening for passage (5) in order to constitute a rolling stop, a stop button (7) of said reel, provided at said shell (3) for the blocking of said tape or on the contrary for the rolling/unrolling of said tape (2), characterised in that said means for marking/cutting an object are comprised of:

a guide shoulder (8) formed on said shell (3) at said opening for the passage (5) of said tape, for translatably engaging along an edge of an object to be marked/cut, a guide opening (9) at said end piece (6) for the removable insertion of the end of a marking/cutting tool and the guiding of said end of the tool, a sliding surface (60) of said end piece (6), for translatably engaging the surface of the object to be marked/cut in order to mark/cut said object using one of the surfaces thereof when said guide shoulder (8) is simultaneously slid along an edge of said object and said end piece (6) of the tape against the surface of the object to be marked/cut.

2. Device according to claim 1, wherein said end piece (6) comprises a square (10) articulated according to an axis of rotation (11), parallel to the winding axis (4) of said reel when said tape is unrolled in a straight manner, without torsion, said square (10) having two wings (12, 13) substantially perpendicular to one another, referred to as first wing (12) and second wing (13), said first wing (12) having said guide opening (9) as well as said sliding surface (60), and wherein said square can pass from a first measuring position (P1) wherein said first wing (12) is substantially perpendicular to said tape (2), said second wing (13) engaging as a stop with said tape, to a second position (P2) for the marking or the cutting wherein said first wing (12) is retracted against the tape, comprising a pad for said surface to be marked/cut, said guide opening (9) then being located in front of the distal end of said tape (2).

3. Device according to claim 2, wherein the end piece (6) is comprised of said square (10) and of an element (14) attached in an integral manner at the end of said tape (2), said fastening element (14) having two lugs (15) located in front of the end of said tape (2), engaging in rotation respectively with two coaxial trunnions of said square (10).

4. Device according to claim 2 wherein the section of the tape (2) is concave, said second wing (13) of said square (10) has a section of curvature corresponding to the concavity of the section of the tape (2) in such a way that said second wing (13) hugs the section of said tape in said first measuring position (P1).

5. Device according to claim 3 wherein the section of the tape (2) is concave, said second wing (13) of said square (10) has a section of curvature corresponding to the concavity of the section of the tape (2) in such a way that said second wing (13) hugs the section of said tape in said first measuring position (P1).

6. Device according to claim 1, wherein said guide shoulder (8) of the shell (3) consists of a first surface (81) which extends in the plane of said opening for the passage (5) of said tape (3), and a second surface (82) perpendicular to said first surface (81).

7. Device according to claim 6, wherein said second surface (82) is comprised of two protrusions (83, 84) of the shell (3), arranged on either side of said opening for passage (5).

8. Device according to claim 7, wherein the first surface (81) of said guide shoulder (8) is of a height (I1) between 5 mm and 13 mm.

9. Device according to claim 6, wherein the first surface (81) of said guide shoulder (8) is of a height (I1) between 5 mm and 13 mm.

10. Device according to claim 1, wherein the guide opening (9) comprises an oblong opening (20), with a longitudinal axis parallel to the winding axis (4) of said reel when said tape (3) is unrolled in a straight manner, without torsion, intended for inserting therein the blade of a cutter, in a removable manner.

11. Device according to claim 10, wherein the guide opening (9) comprises, in addition to said oblong opening (20), a median notch (19), of a greater width, intended for inserting therein the tip of a pencil, in a removable manner.

12. Device according to claim 1, wherein said means for marking/cutting an object are dimensioned for the marking or the cutting of boards with a thickness of 13 mm.

13. Process for the marking or the cutting of an object (100) having at least one surface (101) and one edge (102) of said surface, which comprises:

providing a tape-measure device according to claim 1, placing said guide shoulder (8) against the edge (102) of the surface (101) of said object (100) by adjusting the length of the tape (3) according to the measurement of said object to be marked/cut, the end piece (6) of said tape braced against said surface (101) of said object, inserting the end of a marking/cutting tool into the guide opening (9) of said end piece (6), and cutting or marking said object by sliding simultaneously said guide shoulder (8) along the edge (102) of said object and the end piece (6) of the tape against the surface (101) of said object to be marked/cut.

* * * * *